Figure 2:
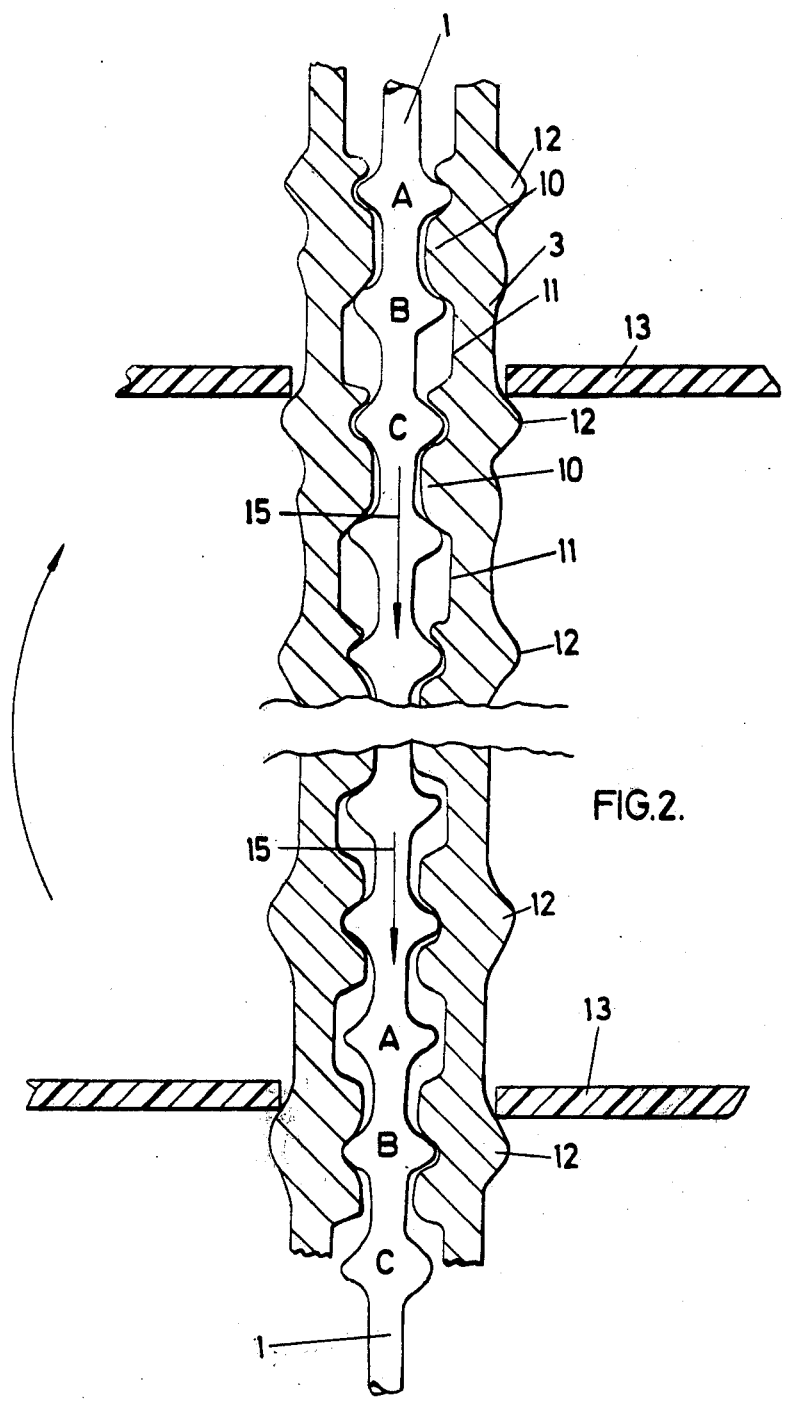

United States Patent [19]
Ridler et al.

[11] 3,966,215
[45] June 29, 1976

[54] PHONOGRAPH AUTO-CHANGER CENTER SPINDLE

[75] Inventors: Keith Douglas Ridler, Fulbourn; Alexander Bennett Gosling, Linton, both of England

[73] Assignee: Stratheaurn Audio Limited, Belfast, Ireland

[22] Filed: Jan. 29, 1975

[21] Appl. No.: 545,164

[30] Foreign Application Priority Data
Feb. 1, 1974 United Kingdom............... 4812/74

[52] U.S. Cl. .............................................. 274/10 S
[51] Int. Cl.² ........................................ G11B 17/04
[58] Field of Search ................................ 274/10 S

[56] References Cited
UNITED STATES PATENTS

| | | | |
|---|---|---|---|
| 1,719,184 | 7/1929 | Koester et al. ................. | 274/10 S |
| 2,837,338 | 6/1958 | Andres ............................. | 274/10 S |
| 3,265,393 | 8/1966 | Freier .............................. | 274/10 S |
| 3,380,741 | 4/1968 | Babler et al. ................... | 274/10 S |
| 3,506,273 | 4/1970 | Thevenaz ........................ | 274/10 S |

Primary Examiner—Richard E. Aegerter
Assistant Examiner—Steven L. Stephan
Attorney, Agent, or Firm—Cushman, Darby & Cushman

[57] ABSTRACT

A phonograph auto-changer center spindle has a sleeve of flexible material in which bulges can be produced to prevent a disc record from dropping on to a turntable, the bulges being reduced in size or moved in position along the sleeve to control the movement of a disc record on the spindle.

7 Claims, 10 Drawing Figures

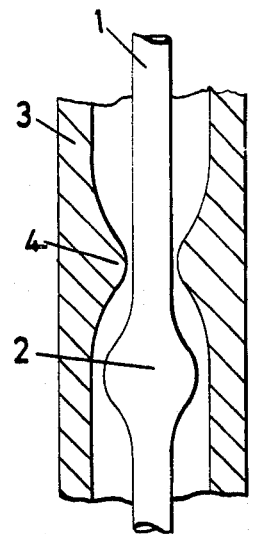
FIG.1a.
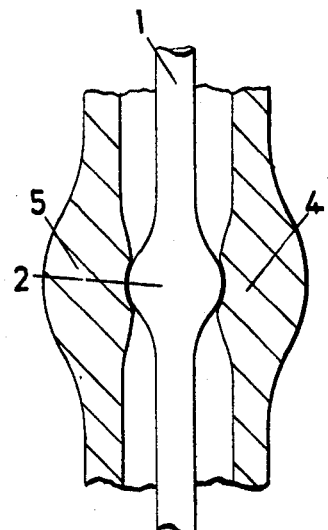
FIG.1b.
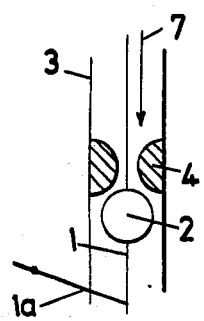
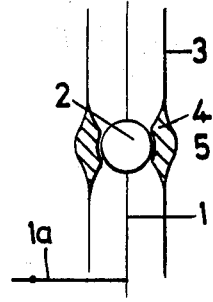
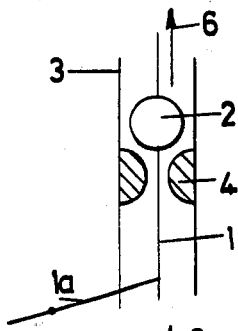
FIG.1c.
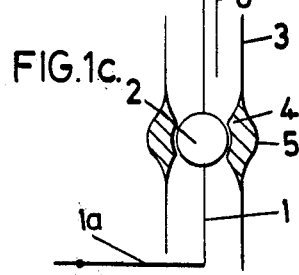
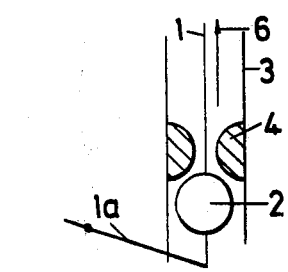
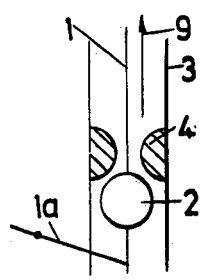
FIG.1d.

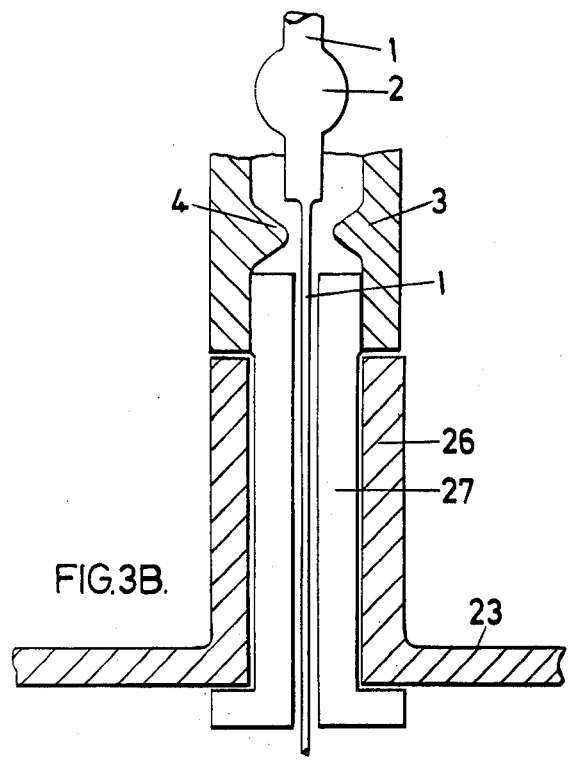
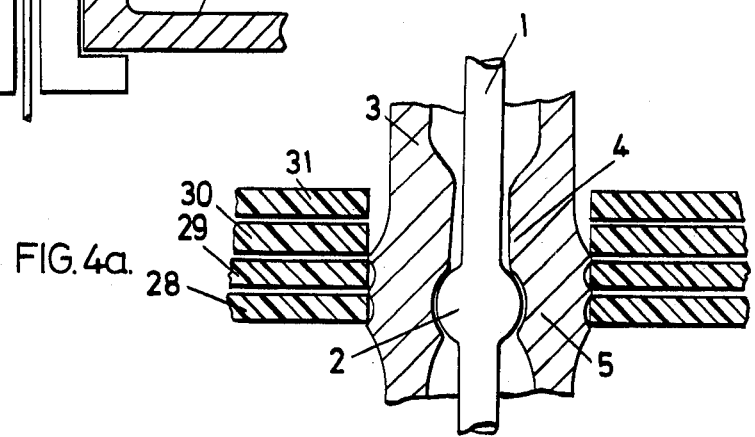
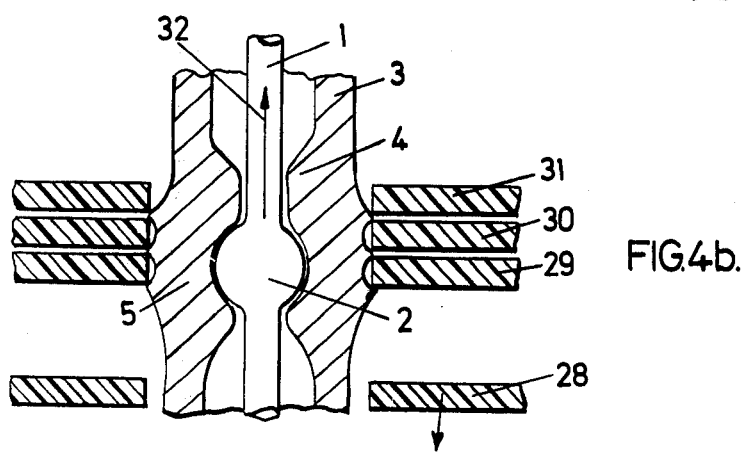

PHONOGRAPH AUTO-CHANGER CENTER SPINDLE

This invention relates to a phonograph auto-changer centre spindle.

Many record reproducing equipments incorporate automatic record or disc changing devices that permit a number of records to be played consecutively, without further manual attention, after the records have been initially loaded into the device.

A well known form of such devices includes a controlled escapement that permits a record to fall, when a pick-up arm has moved clear of a turntable, under the influence of gravity, from a stock of unplayed records on to the turntable, which may be carrying records that have already been played.

In one known form of escapement employing a centre spindle, the spindle is usually non-rotating and the escapement tends to load a limited part of the periphery of the hole in the record heavily as the record is released. The extra load on the record at the escapement caused by the stack of other unplayed records tends to aggravate this situation. The effect both of the non-rotating spindle and of the escapement results in the degradation of the periphery of the central hole in the record due to abrasion between the edge of the hole and parts of the spindle. Ultimately, the hole can become so distorted that a record is able to move eccentrically. Both the record and the stylus then become liable to accelerated wear and the reproduced signal has WOW superimposed on it. The records in a stack to be played are often maintained horizontal by a steadying arm that rests on the stack and gradually drops as the escapement allows the records to drop in turn. There is generally a switch associated with this arm, the switch being arranged to deactivate the record reproducing equipment when the last record has been played.

In another form of escapement a rim-picker device is employed, often in association with a stepped centre spindle. The rim-picker type device is, however, liable to damage the outer edge of a record. This can ultimately cause damage to the stylus during playing in the lead-in groove. Additionally, the edge of the central hole in the record can also be subject to similar wear to that described above, although with some forms of this auto-changing device it is possible to use a rotating centre spindle which reduces the likelihood of this form of wear. Any encumbrance of the upper surface of a record reproducing device with an autochanger assembly and the possibility that the assembly permits only one predetermined size of record to be played at each loading are also disadvantages of known arrangements.

The present invention provides a centre spindle escapement arrangement which is less likely to subject the periphery of the central hole of a record to localised damaging forces than the known arrangements. Additionally, a rotating spindle may be provided at record playing height. The invention may be used under certain circumstances with a record steadying arm of the type described above. However, since the escapement according to the invention coacts evenly with the periphery of the hole in the record, records tend to remain horizontal without additional support, unlike most conventional centre spindle escapement autochangers, and additional record steadying devices may be dispensed with.

Figure 3A:
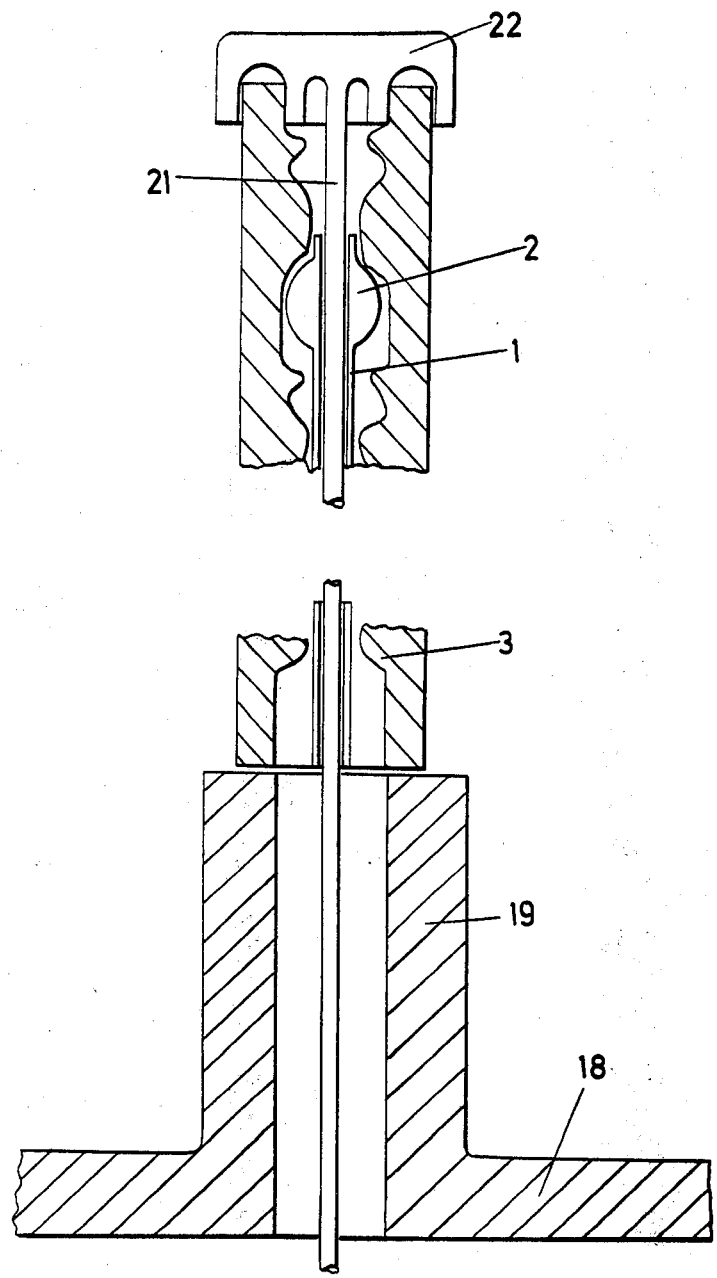
Figure 5:
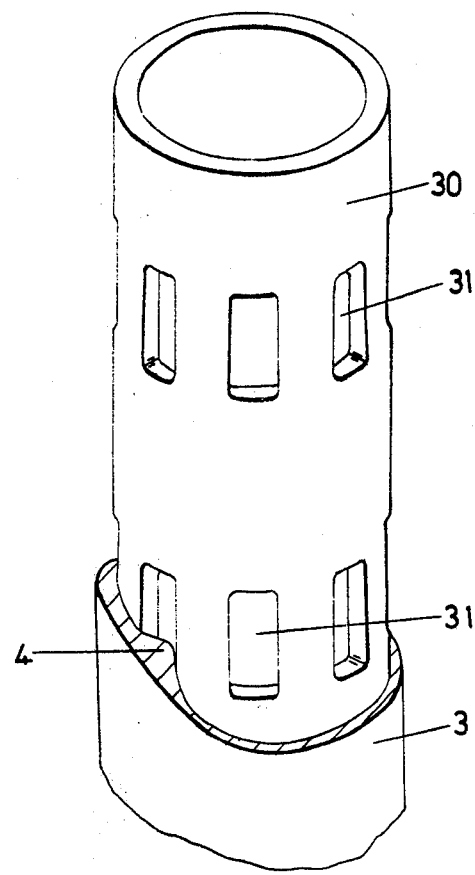

Embodiments of the invention will now be described, by way of example, with reference to the accompanying drawings in which:

FIG. 1 illustrates at $a$ and $b$ longitudinal sections through part of a spindle arrangement and diagrammatically at $c$ and $d$ relative movements between the parts shown at $a$ and $b$, FIG. 2 is a longitudinal section through a part of a further spindle arrangement in two different positions, FIG. 3A is a longitudinal section through a part of a spindle and turntable arrangement, FIG. 3B is a longitudinal section through a part of a further spindle and turntable arrangement, FIG. 4 shows at $a$ and $b$ a longitudinal section through a part of yet another spindle arrangement and FIG. 5 is a cut-away perspective view of a part of yet another spindle arrangement.

Referring to FIG. 1 at $a$, there is shown a part of a plunger 1 having a bulge 2. The plunger 1 passes through the centre of a hollow cylindrical sleeve 3 of resilient material. The sleeve 3 has a constriction formed by an inwardly projecting bulge 4, which, during longitudinal movement of the plunger 1 relative to the sleeve 3, engages the bulge 2 in the plunger 1. In FIG. 1 at $b$ the effect of relative longitudinal movement between the plunger 1 and the sleeve 3 is shown. The plunger 1 and the sleeve 3 have been moved relatively longitudinally so that the bulge 2 in the plunger 1 and the inwardly projecting bulge 4 in the sleeve 3 coincide. This results in a distortion of the outer surface of the sleeve 3 so that, instead of the outer surface of the sleeve being smooth and cylindrical, a bulge 5 is produced. In its undistorted state, the outer diameter of the sleeve 3 is such that it fits the central hole in a record and the record can slide easily over the sleeve 3. The bulge 5 in FIG. 1 at $b$ is sufficiently large to prevent a record from sliding further along the sleeve 3 than the bulge 5 and thus the bulge 5 provides a location for a record.

Referring to FIG. 1 at $c$ there is shown diagrammatically a plunger 1 having a bulge 2 and a resilient sleeve 3 having an inwardly projecting bulge 4 which provides a constriction in the central hole in the tubular sleeve 3. FIG. 1 at $c$ indicates movement by lever means 1$a$ of the plunger 1 relative to the sleeve 3 in the direction of an arrow 6. Thus, in the lower of the three diagrammatic illustrations of FIG. 1$c$, the bulge 2 in the plunger 1 is below the inwardly projecting bulge 4 in the sleeve. In the centre of the three illustrations, the bulge 2 coincides with the bulge 4 and produces an outwardly extending bulge 5 in the sleeve 3 which is suitable for the location of a record. Continued movement of the plunger 1 relative to the sleeve 3 in the direction of the arrow 6 results in the bulge 2 being located above the bulge 4 so that the outer surface of the sleeve 3 is restored, as is shown in the upper of the illustrations, to the normal smooth shape shown in the lower illustration and the record that had previously been located by the outward bulge 5 is able, with the parts in the positions shown in FIG. 1$c$, to pass along the sleeve 3.

An alternative method of producing the same effect is illustrated with reference to FIG. 1 at $d$. In the lower of these last mentioned illustrations, the plunger 1 is shown being moved upwardly by lever means 1$a$ in the direction of the arrow 9 in relation to the sleeve 3. In the centre one of the three illustrations of FIG. 1$d$, the sleeve 3 has moved sufficiently for the bulge 2 to coincide with the bulge 4 and an outwardly projecting bulge 5 to be formed in the surface of the sleeve 3. In order to restore the outer surface of the sleeve 3 to the shape shown in the lower of the three illustrations, the direction of movement of the sleeve 3 is reversed from that shown in the lower illustration, as indicated by the arrow 7 and the relative positions of the plunger 1 and the sleeve 3 are restored, as is shown in the upper of the illustrations.

It can thus be seen that a bulge for locating a record can be produced in a flexible sleeve and then removed thereby to firstly locate a record and then to allow it to drop to a lower position, either by producing a relative movement between a plunger and the sleeve in one direction or by providing a reciprocating relative movement between them.

In the lower part of FIG. 2, there is shown, in a first position, an arrangement of a plunger 1 and a sleeve 3 by means of which a record can be lowered gradually towards a turntable. In the upper part of FIG. 2, the same arrangement is shown in a subsequent operating position. The plunger 1 has a succession of bulges labelled A, B and C respectively. The resilient sleeve 3 has a succession of relatively long bulges 10 which project inwardly from the inner surface 11 of the sleeve. Interaction between the bulges A, B and C of the plunger 1 and the bulges 10 of the sleeve 3 causes outwardly projecting bulges 12 to be produced in the outer surface of the sleeve 3. It will be seen that, in the operating position shown in the lower part of the figure, the bulge 12 in the outer surface of the sleeve 3 caused by the bulge B on the plunger 1 provides a location for a record 13. With movement of the plunger 1 in the direction of arrow 15, relative to the sleeve 3, to the position shown in the upper part of the figure, the bulge B in the plunger 1 moves out of contact with the bulge 10 in the sleeve 3 so that the record 13 can drop down under the influence of gravity on to the bulge 12 in the sleeve 3 produced by the bulge C in the plunger 1. Thus a series of records each located by a respective bulge will travel with the movement of the spindle 3 down one bulge 12 and then drop on to the next bulge 12 under the influence of gravity. In this way a smooth progression of a stack of records can be produced along the length of a sleeve.

Arrangements in which a spindle locating a record on a turntable rotates with a turntable and thereby reduces the possibility of damage to the periphery of the hole in the centre of a record, will now be described with reference to FIG. 3A and FIG. 3B. Referring to FIG. 3A there is shown a turntable 18 having an integral hollow spindle 19. A rod 21 which passes through the centre of the spindle 19 carries a cap 22. Between the cap 22 and the top of the spindle 19, there is a hollow tubular sleeve 3 of the type previously described. A hollow plunger 1 shown broken away, having bulges such as that shown at 2, is located on the rod 21. The plunger 1 is movable relative to the sleeve 3 by means not shown in the way previously described to control the movement of a record from a holding position above the turntable to a position on to the turntable about the spindle 19. In FIG. 3B there is shown an arrangement in which a turntable 23 having an integral spindle 26 has a centrally positioned hollow tubular sleeve 27 of rigid material which locates the sleeve 3 so that it is in line with the spindle 26. The plunger 1 with its bulges 2 extends through the sleeve and is movable relative to the sleeve 3 in order to control the movement of records along the sleeve until they are allowed to fall from a holding position on to the turntable 23. It will be understood that, with the arrangements of FIGS. 3A and 3B, records and the spindle holding them in the holding position are kept stationary with respect to the turntable, whereas as soon as they are lowered on to the turntable, the integral spindle rotates with them and the turntable.

It is also possible to control the movement of a record along a sleeve by gripping the record at the edges of its central aperture instead of allowing it to rest upon the bulging outer surface of the sleeve. Referring to FIG. 4 there is shown a plunger 1, having a bulge 2 extending within a cylindrical resilient sleeve 3 which has an inwardly projecting bulge 4. Coincidence of the elongated internal bulge 4 with the shorter bulge 2 results in an outward bulge 5 in the sleeve 3. A stack of phonograph records 28, 29, 30 and 31 is arranged on the sleeve 3, the lower records 28 and 29 being actually gripped by the bulge 5, as shown in FIG. 4 at a, and the records 30 and 31 resting on the records 28 and 29. Movement of the plunger 1 in the direction of arrow 32 relative to the sleeve 3 by a given amount results in the release of the record 28, as indicated in FIG. 4b on to the turntable. Further records can be released by continued movement of the plunger, as required. With this arrangement a single record can be lowered at a time from a stack on to a turntable. It is possible to use either a plurality of bulges 2 on the plunger 1 and a single inwardly projecting bulge 4 on the sleeve 3, or a plurality of inwardly projecting bulges 4 on the sleeve 3 and a single bulge 2 on the plunger. It is comparatively easy to load the records since there are no obstructions to negotiate during the loading process.

Where necessary the sleeve 3 can be stiffened, for example in the way illustrated in FIG. 5 where a rigid sleeve 30 having perforations 31 through which inwardly projecting bulges 4 can extend, is shown within a sleeve 3 of resilient material. The bulges 2 on the plunger 1 are able to act upon the bulges 4 through the perforations 31.

Various designs of centre spindle or plunger escapement and of resilient sleeve can be made and the invention is not limited to the particular shapes or arrangements shown. The plunger can be of rigid or resilient material. It will be understood by the relative longitudinal movements between the members it is possible to control the longitudinal movement of discs by an action in which discs rest on bulges or are gripped by bulges or by a combination of these actions.

In one variation, which will be described with reference to FIG. 5, since the configuration is exactly the same, although the parts are different, the rigid sleeve 30 replaces the plunger 1. The sleeve 30, in this variation, is movable longitudinally relative to the sleeve 3 and when the sleeves 3 and 30 are in the relative positions shown, the bulges 4 project into the perforations 31 and the outer surface of the sleeve 3 is smooth and devoid of bulges so that a disc record can slide along the sleeve 3. Relative longitudinal movement of the sleeves 3 and 30, such that the bulges 4 rest on the smooth surface of the sleeve 30 and no longer enter the perforations 31, results in bulges being produced in the outer surface of the sleeve 30 opposite to the bulges 4 of sufficient size to prevent a disc record passing along the sleeve 3. It will be appreciated that the perforations 31 need not be rectangular; they could, for example, be circular. It is alternatively possible to have indentations in place of the perforations 31.

We claim:

1. A phonograph auto-changer centre spindle including a one-piece tubular sleeve of resilient material having an operating length over which it is continuous, an operating spindle within the sleeve, means to move the resilient sleeve and the operating spindle relative to one another longitudinally to first and second respective positions, the resilient sleeve having an operating length which is at least equal to the thickness of a plurality of records to be played, said sleeve co-operating with the operating spindle over its operating length and having variations in the cross-sectional area of its wall along its operating length and the operating spindle having a plurality of variations in its surface which co-operate with the variations in the resilient sleeve to produce a plurality of bulges in the external surface of the sleeve in the first of the said respective positions, each bulge being of a size sufficient to prevent a disc record on the centre spindle from passing along the centre spindle, at least a part of each bulge being reduced in size sufficient to allow a disc record to pass over the said parts when the sleeve and the operating spindle are in the second of the said respective positions.

2. A phonograph auto-changer centre spindle according to claim 1, including inwardly projecting portions on the sleeve of resilient material at intervals along its length and outwardly projecting portions on the operating spindle at intervals along its length, the projecting portions being so dimensioned that the positioning of a projecting portion of operating spindle in engagement with a projecting portion of a sleeve in the first of the said relative positions produces the said bulge.

3. A phonograph auto-changer centre spindle according to claim 2 wherein the operating spindle is hollow.

4. A phonograph auto-changer centre spindle according to claim 3 for use with a turntable having an integral upstanding hollow spindle including a hollow tubular sleeve of rigid material arranged partly within the sleeve of resilient material and partly within the integral hollow spindle in order to locate the sleeve of resilient material so that it is in line with the integral hollow spindle.

5. A phonograph auto-changer centre spindle according to claim 1 including between the tubular sleeve of resilient material and the operating spindle a sleeve of rigid material defining apertures therein through which the means to produce the bulge can act.

6. A phonograph auto-changer centre spindle according to claim 1 wherein the operating spindle is constituted by a tubular sleeve defining apertures at intervals along its length and including inwardly projecting portions on the sleeve of resilient material at intervals along its length to provide the said variations in cross-sectional area, the inwardly projecting portions and the apertures being so dimensioned that the positioning of an inwardly projecting portion of the sleeve in engagement with the tubular sleeve in the first of the said relative positions produces the said bulge, the inwardly projecting portions entering a respective aperture in the sleeve in the second of the respective positions.

7. A method of operating a phonograph auto-changer centre spindle having a one-piece tubular sleeve of resilient material, the sleeve having an operating length over which it is continuous and which is at least equal to the thickness of a plurality of records to be played and having variations in the cross-sectional area of its wall along its operating length, an operating spindle within the sleeve having a plurality of variations in its external surface which cooperate with the variations in the resilient sleeve over its operating length, the sleeve and the operating spindle being movable longitudinally relative to one another, so that, upon relative longitudinal movement of the sleeve and the spindle to the first respective position, cooperation between the spindle and the sleeve produces in the external surface of the sleeve a plurality of bulges each having at least a part of sufficient size to prevent a disc record on the centre spindle from passing along the centre spindle, and, upon relative longitudinal movement of the sleeve and the operating spindle to second respective positions, the size of the said part of each bulge is reduced sufficiently to allow a disc record on the centre spindle to pass over the said parts of the bulges.

* * * * *